United States Patent [19]

Quiring et al.

[11] 4,245,081

[45] Jan. 13, 1981

[54] PROCESS FOR THE PRODUCTION OF THERMOPLASTIC POLYURETHANE ELASTOMERS

[75] Inventors: Bernd Quiring, Leverkusen; Georg Niederdellmann, Dormagen; Wilhelm Goyert, Cologne; Hans Wagner, Dormagen, all of Fed. Rep. of Germany

[73] Assignee: Bayer Aktiengesellschaft, Leverkusen, Fed. Rep. of Germany

[21] Appl. No.: 29,957

[22] Filed: Apr. 13, 1979

[30] Foreign Application Priority Data

Apr. 21, 1978 [DE] Fed. Rep. of Germany ....... 2817456

[51] Int. Cl.$^3$ .............................................. C08G 18/32
[52] U.S. Cl. ................................ 528/65; 264/176 R; 528/67; 528/75; 528/76; 528/80; 528/83; 528/85
[58] Field of Search ................... 528/65, 67, 75, 76, 528/80, 83, 85; 264/176 R

[56] References Cited

U.S. PATENT DOCUMENTS

| | | | |
|---|---|---|---|
| 3,214,411 | 10/1965 | Saunders et al. | 528/44 |
| 3,233,025 | 2/1966 | Frye et al. | 528/288 |
| 3,642,964 | 2/1972 | Rausch et al. | 264/40 |
| 3,963,679 | 6/1976 | Ullrich et al. | 264/211 |
| 3,984,607 | 10/1976 | Thoma et al. | 428/425 |
| 4,035,213 | 7/1977 | Thoma et al. | 428/424 |

FOREIGN PATENT DOCUMENTS 2447368  4/1976  Fed. Rep. of Germany.
2610980  9/1977  Fed. Rep. of Germany.

*Primary Examiner*—Maurice J. Welsh
*Attorney, Agent, or Firm*—Gene Harsh; Joseph C. Gil

[57] ABSTRACT

The instant invention is directed to a continuous process for the production of thermoplastic polyurethanes by reacting A. one or more substantially linear polyols having molecular weights in the range from 400 to 10,000,
B. one or more organic diisocyanates and
C. a hydroxyl-group-containing chain extender having a molecular weight below 250, the ratio of the NCO-groups in component (B) to the Zerewitinoff-active groups in components (A) and (C) lying between 0.90 and 1.2, in extruders, characterized in that the chain extender (C) used is a mixture of at least two different glycols, of which one is present in a quantity of from 50 to 99% by weight, based on the total amount of component (C), and a second in a quantity of from 1 to 50% by weight, based on the total amount of component (C).

5 Claims, No Drawings

PROCESS FOR THE PRODUCTION OF THERMOPLASTIC POLYURETHANE ELASTOMERS

BACKGROUND OF THE INVENTION

Because of their outstanding physical properties thermoplastic polyurethanes have been used for many years for a variety of different applications. Of the many processes described in the literature for producing thermoplasts of this type, direct production in self-cleaning twin-screw extruders is of particular interest. In machines of this type, the reaction mixture is homogenized very rapidly. In addition, the screws clean one another and the barrel in every zone, thereby avoiding even temporary caking of the reaction mixture which due to the prolonged effect of heat could lead to decomposition or to crosslinked products.

In conventional processes, special measures must be taken in order to combine the reactants (relatively high molecular weight polyol, chain extender and diisocyanate) in such a way that a homogeneous mixture is formed before the polyurethane formation begins to any significant extent. If the reactants are mixed too slowly, the polyurethanes formed are inhomogeneous and contain completely or substantially insoluble or infusible gel particles.

According to the teaching of U.S. Pat. No. 3,233,025, the individual reactants are combined initially in a special mixing unit and it is only the homogeneous reaction melt which is introduced into the screw extruder.

In the process described in U.S. Pat. No. 3,642,964, the reactants must be mixed very quickly. This result is obtained by intensively homogenizing the reaction melt by means of kneading elements provided in a mixing zone of a twin-screw extruder at the latest six seconds after the diisocyanate and diol have been introduced. In addition, in order to obtain a uniform product, the melt viscosity must remain substantially constant (between about 100 and 1000 Pa s) over the entire length of the extruder.

By contrast, according to the teaching of German Offenlegungsschriften, Nos. 2,302,564 and 2,549,372, the reaction mixture must be intensively mixed by means of kneading elements in the screw at a stage at which the reaction melt still has a low viscosity (approximately 20 to 70 Pa s) in order to prevent inhomogeneities from being formed in the end product.

In the processes according to German Offenlegungsschriften Nos. 2,447,368 and 2,610,980, a temperature profile decreasing from the feed zone to the output end of the extruder must be adjusted in the reaction melt. The production of a homogeneous thermoplastic polyurethane in accordance with the teaching of German Offenlegungsschrift No. 2,610,980 would appear to be particularly difficult because the starting products are first heated to a high temperature and only then are combined with one another. In the absence of rapid mixing, the polyurethane reaction would appear to take place to a considerable extent while local over-concentrations of the individual reactants are still present, so that a non-uniform product is formed. In addition, the starting temperatures are so high that the polyurethane formed can be thermally damaged.

DESCRIPTION OF THE INVENTION

It has now surprisingly been found that thermoplastic polyurethanes can be produced in extruders, preferably multi-screw extruders and, most preferably, self-cleaning twin-screw extruders, by a process in which none of the above-mentioned aids for obtaining a rapid mixing of the reaction melt is necessary. In the practical application of the process of the invention, there is no need for kneading elements to be arranged at a certain point of the screws. The reactants do not have to be premixed, nor is it necessary to maintain a very narrow temperature and/or viscosity profile.

The present invention relates to a continuous process for the production of thermoplastic polyurethanes by reacting (A) one or more substantially linear polyols having molecular weights in the range from 400 to 10,000 and preferably in the range from 450 to 6000, (B) one or more organic diisocyanates and (C) a hydroxyl-group-containing chain extending agent having a molecular weight below 250, the ratio of the NCO-groups in component (B) to the Zerewitinoff-active groups in components (A) and (C) lying between 0.90 and 1.2 and preferably between 0.95 and 1.10, in extruders, preferably multiscrew extruders and, most preferably, self-cleaning twin-screw extruders, characterized in that the chain extender (C) used is a mixture of at least two glycols of which one is present in a quantity of from 50 to 99% by weight, based on component (C), and a second is present in a quantity of from 1 to 50% by weight and preferably in a quantity of from 1 to 10% by weight, based on component (C), components (A) and (C) being used in a molar ratio of from 1:50 to 5:1 and preferably in a molar ratio of from 1:15 to 1:1.

According to the invention, suitable substantially linear polyols having molecular weights in the range from 400 to 10,000 and preferably in the range from 450 to 6000 include virtually any polyesters, polylactones, polyethers, polythioethers, polyesteramide, polycarbonates, and polyacetals generally known in the art. These polyols preferably contain two and possibly even three Zerewitinoff-active groups (generally hydroxyl groups). (Where polyols with more than two hydroxyl groups are used, they are generally used in small amounts.) Also suitable are vinyl polymers such as, for example, polybutadiene diols, polyhydroxyl compounds already containing urethane or urea groups, optionally modified natural polyols and other compounds containing Zerewitinoff-active groups, such as amino, carboxyl or thiol groups. These compounds are generally known in the art and are described in detail, for example, in German Offenlegungsschriften Nos. 2,302,564; 2,423,764; 2,549,372 (U.S. Pat. No. 3,963,679) and 2,402,840 (U.S. Pat. No. 3,984,607) and in German Auslegeschrift No. 2,457,387 (U.S. Pat. No. 4,035,213). According to the invention, it is preferred to use hydroxyl-group-containing polyesters of glycols and adipic acid, phthalic and/or terephthalic acid and their hydrogenation products, hydroxyl polycarbonates, polycaprolactones, polyethylene oxide, polypropylene oxide, polytetrahydrofuran and mixed polyethers of ethylene oxide and propylene oxide.

Diisocyanates which may be used in accordance with the invention include the aliphatic, cycloaliphatic, aromatic, araliphatic and heterocyclic diisocyanates generally known in the art, as described for example in the above-mentioned German Offenlegungsschriften Nos. 2,302,564; 2,423,764; 2,549,372; and 2,402,840 and German Auslegeschrift No. 2,457,387. According to the invention, preferred diisocyanates include optionally substituted hexamethylene diisocyanates, isophorone diisocyanate, lysine ester diisocyanates, the various tolylene, diphenyl methane and xylylene diisocyanates and their hydrogenation products.

The chain extenders which may be used in accordance with the invention are also generally known and are described for example in German Offenlegungsschriften Nos. 2,302,564; 2,549,372; 2,402,799; and 2,402,840 and German Auslegeschrift No. 2,457,387. However, it is of critical importance to the present invention to use at least two glycols as chain extenders. The second glycol is used corresponding to a proportion by weight of from 1 to 50% and preferably from 1 to 10% of the chain extender mixture. According to the invention, preferred glycols include ethylene glycol, di- and tri-ethylene glycol, 1,2-propane diol, 1,3- and 1,4-butane diol, 1,6-hexane diol, 2-ethyl-1,3-hexane diol, 2,2-dimethyl propane diol, 1,4 -bis-hydroxymethyl cyclohexane and hydroquinone dihydroxy ethyl ether. It is particularly preferred to use ethylene glycol, diethylene glycol, 1,2-propane diol, 1,3-butane diol and 1,4- and 1,6-hexane diol.

It has surprisingly been found that, even where only 1 to 2% by weight of a second glycol is used as co-chain extender, the production of polyurethane thermoplasts in extruders is considerably simplified. In that case, there is no longer any need to adhere to a specific temperature program or to a specific viscosity of the reaction melt or to design the trim of the screw with a high degree of precision. Even if the reaction parameters change within wide limits, the products issuing from the extruder are still homogeneous and substantially free from gel particles.

In practice, quantities of co-chain extender of up to 10% by weight and, under favorable conditions, of up to 15% by weight, based on the chain extender glycol mixture, do not lead to any changes in the physical properties of the thermoplastic polyurethanes. Larger quantities of co-chain extender lead for example to a reduction in the softening range and to greater shrinkage.

The process according to the invention may optionally be carried out in the presence of lubricants, stabilizers, catalysts, inorganic and organic fillers, pigments and dyes, thermoplasts, plasticizers, inert organic solvents, and other additives known and mentioned in prior art cited above.

It is also possible to carry out only part of the reaction in a multiscrew extruder, preferably a twin-screw extruder, and to allow the reaction mixture to react to completion in a following single-screw extruder.

Suitable screw extruders are known and are described, for example, in German Pat. Nos. 813,154; 862,668 and 940,109, in German Offenlegungsschrift No. 2,302,564 (U.S. Pat. No. 3,963,679) and in U.S. Pat. Nos. 3,233,025 and 3,642,964.

The residence times of the reaction melt in the screw extruder generally amounts to from between 0.3 and 30 minutes and preferably to from between 0.5 and 4 minutes. The temperature of the screw barrel is generally in the range from about 60° to 280° C. (approximately 80° to 250° C. in the feed zone; approximately 100° to 280° C. in the middle of the extruder and approximately 60° to 250° C. in the discharge zone). The melt issuing from the extruder is quenched and size-reduced by methods known in the art. The end products may be processed thermoplastically or in solution in the usual way to form films, gear wheels, cable sheaths, seals, and the like.

The process according to the invention is illustrated by the following Examples. Unless otherwise indicated, the quantities quoted represent parts by weight and percentages by weight. A twin-screw kneader of the ZSK 53 V type manufactured by Messrs. Werner & Pfleiderer of Stuttgart with a self-cleaning screw trim is used in all of the Examples. The length of the processing section corresponds to approximately 42 times the screw diameter. The same screw trim with the kneading elements contributing approximately 20% is used for all the Examples. The processing section consists of twelve housings of which the first is provided with a feed hopper. The function and mode of operation of the screw extruder and of the kneading and delivery elements of the screw trim etc. are described in detail in Company Manuals issued by Werner & Pfleiderer and in German Offenlegungsschrift No. 2,302,564 (U.S. Pat. No. 3,963,679 ).

EXAMPLES

EXAMPLE 1

600 parts of a polybutane diol adipate (hydroxyl number 53; acid number 0.6) and 399 parts of diphenyl methane-4,4'-diisocyanate are introduced into the feed hopper of the screw extruder, 104 parts of an equimolar mixture of 1,4-butane diol and ethylene glycol being introduced at the end of the second housing.

The following housing temperatures are adjusted along the extruder:

| (a) housing number | 2 | 4 | 6 | 8 | 10 | 11 |
|---|---|---|---|---|---|---|
| T (°C.) | 160 | 173 | 170 | 164 | 183 | 148 |
| (b) housing number | 2 | 4 | 6 | 8 | 10 | 11 |
| T (°C.) | 150 | 200 | 180 | 170 | 170 | 105 |

After cooling, the product issuing from the extruder is dissolved to form a 25% solution in a mixture of equal parts of dimethyl formamide and methylethyl ketone. Clear solutions free from gel particles and having viscosities of (a) 83,000 m Pa s (b) 91,000 m Pa s at 25° C. are formed.

Films produced from these solutions have the following properties (according to DIN 53 504):

| Film | Tensile strength (MPa) | Elongation at break (%) |
|---|---|---|
| (a) | 66 | 440 |
| (b) | 60 | 420 |

EXAMPLE 2

The procedure is the same as in Example 1, except that the mixture of ethylene glycol and 1,4-butane diol is introduced into the fifth housing of the extruder. In other respects, the test is carried out under the same conditions as in Example 1a). The 25% solution of the reaction product in dimethyl formamide/methylethyl ketone has a viscosity of 80,000 m Pa s at 25° C. and a film produced therefrom has a tensile strength of 62 MPa for an elongation at break of 410%.

Comparison Example

The procedure is as in Example 2, except that 1,4-butane diol (123 parts) is used as the sole chain extender. The 25% solution of the reaction product in dimethyl formamide/methylethyl ketone (1:1) contains insoluble gel particles.

EXAMPLE 3

A prepolymer having an NCO-content of 13.8% is produced in the absence of moisture from 100 parts of a difunctional polypropylene glycol having an average molecular weight of 2000 and 96 parts of 4,4'-diphenyl methane diisocyanate at a temperature of 80° C. in the presence of 10 ppm of tin(II) iso-octoate. A mixture heated to 60° C. of 100 parts of a polybutylene adipate having an average molecular weight of 2100 and an acid number of 0.7, 23.6 parts of 1,4-butane diol and 1.6 parts of 1,6-hexane diol is added from a separate pipe to 196 parts of this prepolymer in the hopper of the extruder. The extruder is operated at rotational speeds of (a) 150 min$^{-1}$
(b) 300 min$^{-1}$ at the same temperature. In both cases, homogeneous melts issue from the extruder.

The cooled products are injection-molded to form test specimens which have the following physical values according to DIN 53 504:

| Test specimen (standard bar S 1) | Tensile strength (MPa) | Elongation at break (%) |
|---|---|---|
| (a) | 34 | 560 |
| (b) | 32 | 570 |

EXAMPLE 4

The procedure is as in Example 3, except that the mixture of polybutane diol adipate, butane diol and hexane diol is introduced into the second housing of the screw extruder. Homogeneous product melts are obtained both at a screw speed (a) of 200 min$^{-1}$ and at a screw speed (b) of 300 min$^{-1}$.

Double-shoulder standard bars S 1 tested under the conditions described in DIN 53 504 are found to have the following mechanical properties:

| Test specimen | Tensile strength (MPa) | Elongation at break (%) |
|---|---|---|
| (a) | 36 | 520 |
| (b) | 31 | 560 |

What is claimed is:

1. A continuous process for the production of thermoplastic polyurethanes by reacting
   A. one or more substantially linear polyols having molecular weights in the range from 400 to 10,000,
   B. One or more organic diisocyanates and
   C. a hydroxyl-group-containing chain extender having a molecular weight below 250, the ratio of the NCO-groups in component (B) to the Zerewitinoff-active groups in components (A) and (C) lying between 0.90 and 1.2, in extruders, characterized in that the chain extender (C) used is a mixture of at least two different glycols, of which one is present in a quantity of from 50 to 90% by weight, based on the total amount of component (C), and a second in a quantity of from 1 to 50% by weight, based on the total amount of component (C).

2. The process of claim 1, characterized in that component (C) is a mixture of two glycols in a ratio by weight of from 99:1 to 90:10.

3. The process of claim 1, characterized in that components (A), (B) and (C) are reacted in multiscrew extruders.

4. The process of claim 3, characterized in that the extruder comprises two screws with self-cleaning geometry rotating in the same direction.

5. The process of claim 1, where the molar ratio of components (A) and (C) is from 1:50 to 5:1.

* * * * *